(12) United States Patent
Teixeira et al.

(10) Patent No.: US 12,540,574 B2
(45) Date of Patent: Feb. 3, 2026

(54) METHOD FOR STORING AND RECOVERING ENERGY WITH INDIRECT HEAT STORAGE UPON COMPRESSION

(71) Applicant: IFP Energies nouvelles, Rueil-Malmaison (FR)

(72) Inventors: David Teixeira, Rueil-Malmaison (FR); Elsa Muller-Shernetsky, Rueil-Malmaison (FR); Victor Dupin, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 111 days.

(21) Appl. No.: 18/572,448

(22) PCT Filed: Jun. 21, 2022

(86) PCT No.: PCT/EP2022/066911
§ 371 (c)(1),
(2) Date: Dec. 20, 2023

(87) PCT Pub. No.: WO2022/268830
PCT Pub. Date: Dec. 29, 2022

(65) Prior Publication Data
US 2024/0287932 A1 Aug. 29, 2024

(30) Foreign Application Priority Data
Jun. 24, 2021 (FR) ..................................... 2106769

(51) Int. Cl.
*F02C 6/16* (2006.01)
(52) U.S. Cl.
CPC .......... *F02C 6/16* (2013.01); *F05D 2260/213* (2013.01); *F05D 2260/42* (2013.01)

(58) Field of Classification Search
CPC ............................. F02C 6/16; F05D 2260/42
See application file for complete search history.

(56) References Cited

U.S. PATENT DOCUMENTS

2011/0094229 A1* 4/2011 Freund ...................... F02C 6/16
60/773
2016/0160864 A1* 6/2016 Becquin .................. F04D 25/08
60/659

(Continued)

FOREIGN PATENT DOCUMENTS

FR 3117165 A1 6/2022
GB 2528449 A 1/2016

(Continued)

*Primary Examiner* — Jonathan R Matthias
(74) *Attorney, Agent, or Firm* — FITCH, EVEN, TABIN & FLANNERY, LLP

(57) ABSTRACT

The present invention relates to a compressed-gas energy storage and recovery system and method, comprising:
- a gas compression line (1) with at least two compression stages (3), each comprising a heat storage device downstream from a compression means (100, 101, 102),
- in a compression stage (3), the heat storage device comprises a heat storage means (200, 201) for exclusively direct heat exchange between the compressed gas and heat storage particles, and
- in another compression stage (3), the heat storage device comprises a cooling loop, with an exchanger (800) for heat exchange between the compressed gas and a heat transfer fluid, and a heat storage means (203) for direct heat exchange between the heat storage particles and the heat transfer fluid.

11 Claims, 6 Drawing Sheets

(56) References Cited

U.S. PATENT DOCUMENTS

2018/0187627 A1* 7/2018 Apte ................. F02C 1/105
2022/0196341 A1* 6/2022 Young ............ F28D 20/0034

FOREIGN PATENT DOCUMENTS

| GB | 2537126 A | 10/2016 | | |
|---|---|---|---|---|
| WO | 2015/019096 A1 | 2/2015 | | |
| WO | WO-2015138817 A1 * | 9/2015 | ............. | F01K 13/00 |

* cited by examiner

METHOD FOR STORING AND RECOVERING ENERGY WITH INDIRECT HEAT STORAGE UPON COMPRESSION

CROSS-REFERENCE TO RELATED APPLICATIONS

This application is a U.S. national phase application filed under 35 U.S.C. § 371 of International Application No. PCT/EP2022/066911, filed Jun. 21, 2022, designating the United States, which claims priority from French Application No. 2106769, filed Jun. 24, 2021, which are incorporated herein by reference in their entireties.

FIELD OF THE INVENTION

The present invention relates to the technical field of energy storage and recovery by compressed gas, notably compressed air.

While world energy objectives aim to promote renewable energies in order to progressively increase the proportion thereof in the energy mix, the intermittency and variability of these renewable energies remain their major drawback. To overcome this problem, energy storage appears to be a very advantageous solution. By storing the excess energy generated during production peaks in order to use it when production is below demand, storage allows to side-step the variability constraint and provides flexibility, or even continuity, to renewable energies. Thus, the need for energy storage methods and systems should increase in the coming years, with the proportion of renewable energies in the world energy mix.

Many storage technologies currently exist, for example mechanical type storage such as pumped storage power stations using the hydropower produced by two water reservoirs at different elevations. During the power storage phase, the water in the lower reservoir is pumped into the upper reservoir and stored at this elevation. When electricity demand increases, the water in the upper reservoir is sent back to the lower reservoir through a hydraulic turbine that subsequently generates electricity via an alternator. Hydroelectric dams also work according to the same concept: the dam holds back the water at a higher elevation upstream than downstream, and when the electricity demand increases, the dam releases the water that is run through hydro turbine alternators producing electricity.

Compressed-air energy storage and recovery (CAES) is a technology for which a first plant was built in Germany in the late 1970s, storing 290 MW. The principle of this technology is to use the electricity produced and not consumed for compressing a gas, typically air. In order to avoid damage to the compressors, the heat resulting from compression is removed between each stage. The air compressed to medium or high pressure (40 bar to 300 bar) is sent to a natural storage site such as a salt cavern, a mine (salt, limestone, coal), or to an artificial storage site until the energy discharge phase. During the electricity production phase, the stored air is extracted from the storage site in order to be expanded in turbo alternators after being heated in a combustion chamber.

A variant of the CAES technology is the advanced adiabatic compressed-air energy storage (AACAES) method. The main difference with CAES is that the heat resulting from compression is no longer removed between each stage, i.e. lost, it is stored in order to heat the air upstream from the turbines in the electricity production phase. This reuse of the thermal energy internal to the process allows the efficiency of AACAES to reach about 70%, instead of 50% for CAES. Cooling of the air in compression phase can be done in a heat exchanger with a heat transfer fluid. The hot heat transfer fluid is then stored so as to be able to yield its heat to the air during the expansion phase.

However, these systems require improvements in order to limit the size and/or the mass and/or the cost thereof so as to be economically relevant.

BACKGROUND OF THE INVENTION

A first solution for limiting damage to the compressors is to extract the water from the compression line by means of a gas/liquid separator provided at each compression stage. FIG. 1 from the prior art schematically illustrates, in form of a block diagram, such an AACAES system and method. This figure shows the phase of energy storage by compression of a gas, and the phase of energy production by expansion of a gas. The system of the prior art is comprised of a compression line 1 including one or more compression stages 3 according to the air pressure to be reached and to suppliers' recommendations. In the embodiment illustrated, compression line 1 comprises three compression stages 3. Each compression stage 3 comprises a compression means 100, 101, 102, also referred to as compressor. Compressor 100 is a low-pressure compressor, compressor 101 is a medium-pressure compressor, and compressor 102 is a high-pressure compressor. The gas used in the method illustrated is ambient air having a water saturation related to the temperature and pressure thereof. During the energy storage phase, the air is compressed in compression line 1 and subsequently sent to a compressed air storage means 1000 suited for high pressures. Heat storage and recovery devices 200, 201, 202 are arranged after each compressor 100, 101, 102 of each compression stage 3 in order to cool the hot compressed air at the compression outlet while storing this thermal energy. Heat storage and recovery device 200 is suited for low pressure, heat storage and recovery device 201 is suited for medium pressure, and heat storage and recovery device 202 is suited for high pressure. Cooling means 300, 301, 302 can be arranged after heat storage and recovery devices 200, 201, 202 if necessary in order to complete cooling of the compressed air before the next compression stage or prior to storage thereof. Once the air cooled and before the next compression stage, the condensed water from the humidity in the air is extracted from the air compression stream by gas/liquid separators 400, 401, 402 so as to have air without any trace of liquid water at the compressor inlet. This water condensation can take place in heat storage and recovery devices 200, 201, 202 and/or in cooling means 300, 301, 302. During the energy production phase, the compressed air is expanded via one or more turbines 700, 701, 702 of an expansion stage, in order to produce electricity via alternators, not shown in the diagram. Turbine 702 is a low-pressure turbine, turbine 701 is a medium-pressure turbine and turbine 700 is a high-pressure turbine. For this system and this method, the condensed water is just extracted, the associated energy is therefore lost.

Prior art also knows patent application FR20/12/637 filed by the applicant, notably FIG. 2 of this patent application. This figure shows the phase of energy storage by compression of a gas, and the phase of energy production by expansion of a gas. The system is comprised of a compression line 1 including one or more compression stages 3 according to the air pressure to be reached. In the embodiment illustrated, compression line 1 comprises three compression stages 3. Each compression stage 3 comprises a compression means 100, 101, 102, also referred to as compressor. Compressor 100 is a low-pressure compressor, compressor 101 is a medium-pressure compressor, and compressor 102 is a high-pressure compressor. The gas 10 used in the method illustrated is ambient air having a water saturation related to the temperature and pressure thereof. During the energy storage phase, the air is compressed in compression line 1 and subsequently sent to a compressed air storage means 1000 suited for high pressures. Heat storage and recovery devices 200, 201, 202 are arranged after each compressor 100, 101, 102 of each compression stage 3 in order to cool the hot compressed air at the compression outlet while storing this thermal energy. Heat storage and recovery device 200 is suited for low pressure, heat storage and recovery device 201 is suited for medium pressure, and heat storage and recovery device 202 is suited for high pressure. Cooling means 300, 301, 302 can be arranged after heat storage and recovery devices 200, 201, 202 if necessary in order to complete cooling of the compressed air before the next compression stage or prior to storage thereof. Once the air cooled and before the next compression stage, the condensed water from the humidity in the air is extracted from the air compression stream by gas/liquid separators 400, 401, 402 so as to have air without any trace of liquid water at the compressor inlet. This water condensation can take place in heat storage and recovery devices 200, 201, 202 and/or in cooling means 300, 301, 302. The condensed water at each compression stage is then sent to liquid storage means 500, 501, 502. Storage means 500 is suited for low pressures, storage means 501 is suited for medium pressures, and storage means 502 is suited for high pressures. During the energy production phase in expansion line 2, the compressed air is expanded via one or more turbines 700, 701, 702 in each expansion stage 4, according to suppliers' recommendations, in order to produce electricity via alternators, not shown in the diagram. Turbine 702 is a low-pressure turbine, turbine 701 is a medium-pressure turbine and turbine 700 is a high-pressure turbine. In order to improve the efficiency of each turbine, the thermal energy stored in heat storage and recovery devices 200, 201, 202 is yielded to the air stream upstream from each turbine in accordance with the pressure range thereof. Finally, in order to also improve electricity production, the condensed water previously stored in liquid storage means 500, 501, 502 is reinjected upstream from each turbine of the associated pressure range via mixing means 600, 601, 602 (also referred to as mixers) so as to increase the rate of flow into each turbine. The condensed water is then reused in an optimal manner in the expansion phase, and its associated energy is no longer lost.

In these systems of the prior art, heat storage and recovery devices 200, 201, 202 consist of tanks (cylindrical for example) containing heat storage particles (concrete balls or gravel for example). These direct heat storage and recovery devices are suited to store the heat directly by contact between the compressed gas and the heat storage particles. Thus, when the hot compressed fluid (leaving one of compressors 100, 101, or 102) reaches heat storage and recovery device 200, 201 or 202, its heat is directly yielded to the heat storage particles. The compressed fluid thus cooled leaves heat storage and recovery device 200, 201 or 202, the heat being stored in the heat storage particles.

Upon expansion, the compressed fluid is heated prior to flowing into turbine 700, 701 or 702. The compressed fluid therefore is again sent through heat storage and recovery device 200, 201 or 202 where the heat storage particles have stored heat beforehand (during the compression step, as described in the previous paragraph). Thus, the heat of the heat storage particles is yielded to the compressed fluid, which therefore leaves heat storage and recovery device 200, 201 or 202 hotter than when it flowed in. The storage particles are cooled and can thus be used again during a compression step in order to cool the hot compressed fluid leaving a compressor 100, 101 or 102.

As heat storage and recovery devices 200, 201 or 202 are subjected to the compressed fluid pressure, they require significant masses for the tank to withstand the internal pressure, and these significant masses imply high costs. This is notably the case for heat storage and recovery device 202 that is subjected to the highest pressure (last compression stage before storage of the compressed fluid in compressed air storage means 1000). Since the thickness of the shell of this tank of heat storage and recovery device 202 is significant, its cost is high and the logistics operations (notably for its installation) more complex.

SUMMARY OF THE INVENTION

The object of the invention is to reduce the size and the mass (therefore the cost) of the heat storage and recovery device, and therefore of the system, so as to notably reduce the cost thereof, while maintaining the energy performances of the system (mainly the efficiency thereof).

This goal is reached with a compressed-gas energy storage and recovery system comprising:
- a gas compression line with at least two compression stages, each compression stage comprising a compression means, and a heat storage and recovery device arranged downstream from the compression means, in the direction of flow of the compressed gas in the compression stage, each heat storage and recovery device being either exclusively direct or exclusively indirect,
- at least one compressed gas storage means arranged at the outlet of the gas compression line for storing the compressed gas,
- an expansion line for expanding the compressed gas stored in the compressed gas storage means, the expansion line comprising at least two successive expansion stages, each expansion stage comprising pipes and an expansion means, the pipes of each expansion stage being configured to circulate the compressed gas in at least one heat storage and recovery device of the compression stages so as to heat the compressed gas before the expansion means.

Furthermore:
- in at least one of the compression stages, the heat storage and recovery device consists of a direct heat storage and recovery device comprising at least a first heat storage and recovery means comprising first heat storage particles, the first heat storage and recovery means being configured for direct heat exchange between the compressed gas and the first heat storage particles, and
- in at least the last compression stage, in the direction of flow of the compressed gas, the heat storage and recovery device consists of an indirect heat storage and recovery device comprising a cooling loop, the cooling loop comprising a heat exchanger without direct contact for heat exchange between the compressed gas and a heat transfer fluid able to flow through the cooling loop, the cooling loop comprising a second heat storage and recovery means comprising second heat storage particles, the second heat storage and recovery means being configured for direct heat exchange between the second heat storage particles and the heat transfer fluid.

Furthermore, the invention relates to a compressed-gas energy storage and recovery method comprising at least the following steps:

in energy storage phase:
a) compressing at least once a gas in a compression line comprising at least two compression stages, each compression stage comprising at least one compression means,
b) after each compression step, recovering the heat of said compressed gas in at least one heat storage and recovery device; the heat storage and recovery step of at least the last compression step implementing an indirect heat storage and recovery step with a cooling loop comprising a heat exchanger without direct contact (also referred to as indirect-contact exchanger) for heat exchange between the compressed gas and a heat transfer fluid, and a (second) heat storage and recovery means comprising (second) heat storage particles, and the heat storage and recovery step of at least another compression step implementing a direct heat storage and recovery step,
c) storing the cooled compressed gas in at least one compressed gas storage means, in energy recovery phase:
d) circulating the compressed gas leaving the compressed gas storage means in an expansion line of at least two expansion steps, and in each expansion step, heating the compressed gas by circulating it in one of the (direct or indirect) heat storage and recovery devices using the heat stored during the compression step, then expanding the heated compressed gas in an expansion means.

The invention relates to a compressed-gas energy storage and recovery system comprising:
- a gas compression line with at least two compression stages, each compression stage comprising a compression means, and a heat storage and recovery device arranged downstream from the compression means, in the direction of flow of the compressed gas in the compression stage,
- at least one compressed gas storage means arranged at the outlet of the gas compression line for storing the compressed gas,
- an expansion line for expanding the compressed gas stored in the compressed gas storage means, the expansion line comprising at least two successive expansion stages, each expansion stage comprising pipes and an expansion means, the pipes of each expansion stage being configured to circulate the compressed gas in at least one heat storage and recovery device of the compression stages so as to heat the compressed gas before the expansion means.

Furthermore:
in at least one of the compression stages, the heat storage and recovery device is a direct heat storage and recovery device comprising at least a first heat storage and recovery means comprising first heat storage particles, the first heat storage and recovery means being configured for direct heat exchange between the compressed gas and the first heat storage particles, and
in at least the last compression stage, in the direction of flow of the compressed gas, the heat storage and recovery device is an indirect heat storage and recovery device comprising a cooling loop, the cooling loop comprising a heat exchanger without direct contact for heat exchange between the compressed gas and a heat transfer fluid able to flow through the cooling loop, the cooling loop comprising a second heat storage and recovery means comprising second heat storage particles, the second heat storage and recovery means being configured for direct heat exchange between the second heat storage particles and the heat transfer fluid.

Preferably, the compression line comprises as many compression stages as the expansion line comprises expansion stages, each heat storage and recovery device of a compression stage being used in the expansion stage at the corresponding pressure, preferably the expansion line and the compression line each comprise three stages.

Advantageously, at least one compression stage comprises a first cooling means downstream from the heat storage and recovery device, preferably, said cooling means comprising a dry cooler.

Preferably, the cooling loop comprises a second cooling means downstream, in the direction of flow of the heat transfer fluid during charging of the system, from the second heat storage and recovery means, preferably, said second cooling means comprising a dry cooler.

According to a configuration of the invention, at least one compression stage comprises a separation means for separating the compressed gas from a liquid phase before the compressed gas reaches the next compression stage or the compressed gas storage means, each compression stage preferably comprising a liquid storage means for storing said liquid phase at the pressure of the compression stage.

Advantageously, at least one expansion stage comprises a mixing means for mixing with said compressed gas said liquid phase from one of the liquid storage means of the compression stages, the mixing means being positioned upstream from said heat storage and recovery device.

According to an implementation of the invention, the pipes of at least the first expansion stage are configured to circulate the compressed gas in at least one indirect heat storage and recovery device, and the pipes of at least another expansion stage are configured to circulate the compressed gas in at least one direct heat storage and recovery device.

The invention further relates to a compressed-gas energy storage and recovery method comprising at least the following steps:

in energy storage phase:
a) compressing at least once a gas in a compression line comprising at least two compression stages, each compression stage comprising at least one compression means,
b) after each compression step, recovering the heat of said compressed gas in at least one heat storage and recovery device; the heat storage and recovery device of at least the last compression stage being an indirect heat storage and recovery device with a cooling loop comprising a heat exchanger for heat exchange between the compressed gas and a heat transfer fluid, and a second heat storage and recovery means comprising second heat storage particles, and the heat storage and recovery device of at least another stage being a direct heat storage and recovery device,
c) storing the cooled compressed gas in at least one compressed gas storage means, in energy recovery phase:
d) circulating the compressed gas leaving the compressed gas storage means in an expansion line of at least two expansion stages, and in each expansion stage, heating the compressed gas by circulating it in one of the heat storage and recovery devices using the heat stored during the compression step, then expanding the heated compressed gas in an expansion means.

Advantageously, as many compression steps as expansion steps are carried out, and the heat storage and recovery device of each step b) is used for heating the compressed gas of the expansion step at the corresponding pressure.

Preferably, the heat of the compressed gas is recovered by heat storage particles.

Advantageously, after each heat recovery step, the compressed gas is cooled at the outlet of the heat storage and recovery device in a first cooling means before the gas is sent to the next compression step or into the compressed gas storage means.

According to an implementation of the invention, when the heat storage and recovery device is an indirect heat storage and recovery device, the heat transfer fluid of the cooling loop is cooled by a second cooling means positioned on the cooling loop after the heat storage and recovery means.

According to an advantageous configuration of the invention, the compressed gas is separated from a liquid phase it contains in a separation means, before the compressed gas is sent to the next compression stage or to the compressed gas storage means, the liquid leaving each separation means being stored or discharged at the pressure at which it is in a liquid storage means.

Preferably, in each expansion stage, the liquid stored in a liquid storage means is injected or, preferably, mixed with the compressed gas before each heating step.

BRIEF DESCRIPTION OF THE FIGURES

Other features and advantages of the system and/or of the method according to the invention will be clear from reading the description hereafter of embodiments given by way of non-limitative example, with reference to the accompanying figures wherein.

DETAILED DESCRIPTION OF THE EMBODIMENTS

Figure 1:
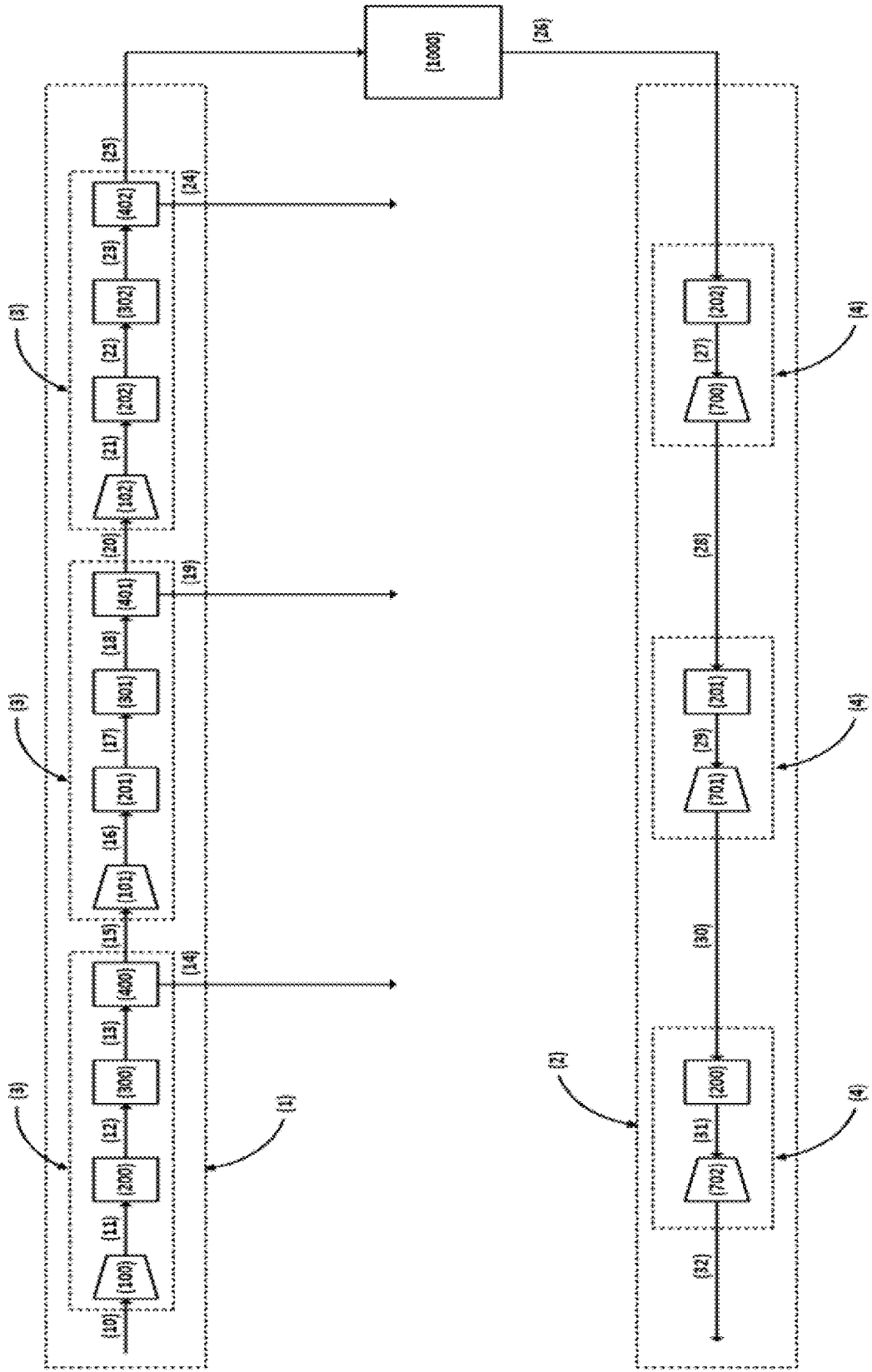
FIG. 1, already described, shows a compressed-gas energy storage and recovery system and method according to the prior art, FIG. 2, already described, shows another compressed-gas energy storage and recovery system and method according to the prior art.

The invention relates to a compressed-gas (compressed air for example, the air being advantageously collected from the ambient medium) energy storage and recovery system comprising:
- a gas compression line with at least two compression stages (preferably three compression stages) for compressing the gas to a pressure at which the compressed gas is stored. Each compression stage comprises a (single) compression means, such as a compressor, for increasing the compressed gas pressure. Using several compression stages (therefore several compression means) allows the compression to be staged in steps, so as to have a high pressure while having acceptable compression efficiencies. Each compression stage also comprises a (single) heat storage and recovery device arranged downstream (in the direction of flow of the compressed gas in the compression stage) from the compression means. Indeed, the gas leaving the compression means is at higher pressure and temperature than when it entered this compression means. Now, the compressed gas is preferably cooled before it reaches the next compression stage or the compressed gas storage means (if the gas flows through the last compression stage) in order to facilitate compression in the next stage or to reduce the design and manufacturing constraints relative to the compressed gas storage means. Each heat storage and recovery device is either exclusively direct or exclusively indirect. By exclusively direct, it is understood that the heat storage and recovery device is a direct-exchange heat storage and recovery device and that it comprises no indirect-exchange heat storage and recovery device. By exclusively indirect, it is understood that the heat storage and recovery device is an indirect-exchange heat storage and recovery device and that it comprises no direct-exchange heat storage and recovery device,
- at least one compressed gas storage means arranged at the outlet of the gas compression line (downstream from the last compression stage) for storing the compressed gas. Since the compressed gas has been cooled beforehand, the compressed gas can be stored at a relatively low temperature (of the order of 30° C. instead of about 200° C. to 300° C. in the absence of a heat storage and recovery device). The thermal stresses of the compressed gas storage means are thus reduced on this component, which allows the mass and therefore the cost thereof to be reduced,
- an expansion line for expanding the compressed gas stored in the compressed gas storage means, thus allowing to recover the energy stored by the compressed gas in the compression line. The expansion line comprises at least two successive expansion stages, each expansion stage comprising pipes and a (single) expansion means for recovery of the energy of the fluid under pressure. The expansion means can notably be a turbine that converts the energy of the compressed fluid to rotary mechanical energy. This rotary mechanical energy can then be sent to a generator that converts it to electrical energy. The pipes of each expansion stage are configured to circulate the compressed gas in at least one heat storage and recovery device (preferably a single heat storage and recovery device) of the compression stages so as to heat the compressed gas before the expansion means. Thus, in each expansion stage, the fluid is heated by one of the heat storage and recovery devices before reaching the expansion means.

Furthermore, in at least one of the compression stages, the heat storage and recovery device is (consists of) a direct heat storage and recovery device comprising at least a first heat storage and recovery means comprising first heat storage particles. Preferably, the heat storage and recovery device consists of a direct heat storage and recovery device: therefore, there is no indirect heat storage and recovery device in this stage, the heat being then stored by direct contact only. The direct heat storage and recovery device comprises at least one (or more) first heat storage and recovery means comprising first heat storage particles. This first heat storage and recovery means can be a tank containing a fixed bed of first heat storage particles (concrete balls or gravel for example). Thus, the compressed gas exchanges directly (by direct contact) the heat it contains with the heat storage particles. This type of direct heat storage and recovery device is preferably used for the "low pressure" compression stages, i.e. preferably the first compression stage and successively, preferably, the second, then the third stage, and so on.

Preferably, when the system has at least three compression stages, the heat storage and recovery device can be (consist of) a direct heat storage and recovery device comprising at least two first heat storage and recovery means, each of these first heat storage and recovery means comprising first heat storage particles.

Direct heat storage and recovery devices are generally easy to implement.

Besides, in at least one compression stage (preferably the last compression stage, i.e. the compression stage just before the compressed gas storage means), in the direction of flow of the compressed gas, the heat storage and recovery device is (consists of) an indirect heat storage and recovery device comprising a cooling loop. Preferably, the heat storage and recovery device consists of an indirect heat storage and recovery device: therefore, in this stage, there is no direct heat storage and recovery device, the heat being then stored by indirect contact only. The indirect heat storage and recovery device comprises at least one (or more) cooling loop(s). The (or each) cooling loop comprises a heat exchanger without direct contact (with indirect contact), also referred to as heat exchange means, for heat exchange between the compressed gas and a fluid transfer fluid able to flow through the cooling loop. The cooling loop comprises (at least) a second heat storage and recovery means comprising second heat storage particles, the (or each) second heat storage and recovery means being configured for direct heat exchange between the second heat storage particles and the heat transfer fluid. When the loop comprises several second heat storage and recovery means, these second heat storage and recovery means can be mounted in series and/or in parallel. Therefore, the heat of the compressed gas is transmitted by the heat exchanger without direct contact (plate exchanger or shell/tube exchanger for example) to the heat transfer fluid. Since heat exchange occurs without direct contact between the compressed gas and the heat transfer fluid (through a plate or a tube), the pressure of the heat transfer fluid can be lower than that of the compressed gas. The heat transfer fluid flows through the cooling loop so as to reach the second heat storage and recovery means where its heat is transmitted to the second heat storage particles. Thus, the heat transfer fluid leaves the second heat storage and recovery means colder than when it entered, and the heat is stored in the second heat storage particles. The advantage of this type of indirect heat storage and recovery device is that the internal pressure of the cooling loop and therefore of the second heat storage and recovery means is (much) lower than that which would prevail in a heat storage and recovery means of a direct heat storage and recovery device, which is in fact at the pressure of the compressed gas. Therefore, this second heat storage and recovery means is less heavy (the walls may be thinner) and its cost is reduced. Furthermore, the greater the pressure difference between the compressed gas of the stage concerned and the heat transfer fluid, the higher the gain in mass and in cost. Using an indirect heat storage and recovery device is therefore advantageous for the "high pressure" compression stages, preferably the last compression stage, then the second last, the antepenultimate, and so on. Advantageously, the cooling loop may comprise no expansion means such as a turbine, and/or comprise no compression means such as a compressor or a pump. Thus, the energy consumption of the system would be reduced. The cooling loop can further comprise an expansion vessel in order to absorb the thermal expansion of the fluid due to the heat recovered, and/or a filter to prevent fine particles, notably likely to form from the heat storage particles, from flowing through the loop.

Preferably, the energy storage and recovery system comprises no compression stages comprising a direct heat storage and recovery device and an indirect heat storage and recovery device. In other words, the heat storage and recovery device of each compression stage consists either of a direct heat storage and recovery device or of an indirect heat storage and recovery device. In this case, there is no compression stage comprising both a direct heat storage and recovery device and an indirect heat storage and recovery device. This combination of direct and indirect heat storage and recovery devices would increase the cost of the system without bringing benefit to the system performances.

Combining the use of exclusively direct (without combination with an indirect heat storage and recovery device) heat storage and recovery devices for some compression stages and exclusively indirect (without combination with a direct heat storage and recovery device) heat storage and recovery devices for other compression stages allows to decrease the mass and the cost of the system while maintaining an attractive efficiency for the system, and the simplest possible system.

For example, the heat storage and recovery device of the last compression stage can consist of a (single) indirect heat storage and recovery device, and the heat storage and recovery devices of the other compression stages (except for the last compression stage) can consist of direct heat storage and recovery devices only. The single indirect heat storage and recovery device of the last compression stage can consist of at least one (one or more) cooling loop(s) as described above (each cooling loop comprises at least one (one or more) second heat storage and recovery means comprising second heat storage particles), and the direct heat storage and recovery devices of the other compression stages can each consist of one or more first heat storage and recovery means, mounted in series and/or in parallel, comprising first heat storage particles. This configuration provides a better compromise between the mass (and the cost) of the system and its performances for energy storage and recovery.

According to some variants that may be combined or not, the system can comprise:
- several compression lines in parallel, ending at a single compressed gas storage means or at several compressed gas storage means. For example, each compression line can be connected to a single compressed gas storage means or to several compressed gas storage means in parallel,
- several expansion lines in parallel, going from a single compressed gas storage means or several compressed gas storage means. For example, each expansion line can be connected to a single compressed gas storage means or to several compressed gas storage means in parallel,
- among the compression stages, several compression stages in parallel,
- among the expansion stages, several expansion stages in parallel,
- in a compression stage, several separation means in series and/or in parallel and/or several cooling means in series and/or in parallel, each compression stage can comprise one or more compression branches in parallel, on which the compression means, the heat storage and recovery devices, the separation means and/or the cooling means can be arranged for example, each expansion stage can comprise one or more expansion branches in parallel, on which the expansion means, the heat storage and recovery devices and/or the mixing means can be arranged for example.

Preferably, the compression line can comprise as many compression stages as the expansion line comprises expansion stages, each heat storage and recovery device of a compression stage being used in the expansion stage at the corresponding pressure.

"Corresponding pressure" is not understood to be an absolute pressure, but the pressure of the stage concerned. In other words, the number of compression stages and the number of expansion stages can be identical. This embodiment enables a "symmetrical" design of the compression and expansion lines, with notably similar operating pressures and temperatures, which promotes heat exchanges in the heat storage and recovery means. Thus, the system and the method are simplified.

For example, when the compression line and the expansion line each comprise three stages, the first compression stage is referred to as "low pressure" stage, the second compression stage is referred to as "medium pressure" stage, and the last compression stage is referred to as "high pressure" stage. The expansion line then comprises a first expansion stage referred to as "high pressure" stage, a second expansion stage referred to as "medium pressure" stage, and a third expansion stage referred to as "low pressure" stage. The terminologies "high pressure", "medium pressure" and "low pressure" are understood relatively among the various stages of the compression line and of the expansion line. Thus, the heat storage and recovery device used for the ("high pressure") third compression stage is used for heating the compressed gas of the ("high pressure") first expansion stage. The heat storage and recovery device used for the ("medium pressure") second compression stage is used for heating the compressed gas of the ("medium pressure") second expansion stage, and the heat storage and recovery device used for the ("low pressure") first compression stage is used for heating the compressed gas of the ("low pressure") third expansion stage. This configuration is advantageous because the pressure and the temperature of each compression stage substantially correspond to the pressure and the temperature of each expansion stage, which allows the performances of the system to be further improved.

Preferably, the expansion line and the compression line can each comprise three stages. This configuration allows the compression and expansion performances to be improved while limiting the cost.

Advantageously, at least one compression stage can comprise a first cooling means downstream from the heat storage and recovery device (in the direction of flow of the compressed gas in the compression stage), whether direct or indirect. The first cooling means is used to further cool the compressed gas before it enters the next compression stage or the compressed gas storage means, so as to further improve compression of the gas in the next stage and/or to reduce the design constraints relative to the compressed gas storage means.

Preferably, the first cooling means can comprise a dry cooler. A dry cooler allows the compressed gas to be cooled only with ambient outside air. It is therefore an inexpensive cooling means, easy to implement. According to a variant, the cooling means can be a shell/tube, plate and/or spiral heat exchanger for heat exchange between the compressed gas and a fluid that may be water, propane, butane, for example.

According to an embodiment of the invention, the cooling loop can comprise a second cooling means downstream from the second heat storage and recovery means (in the direction of flow of the heat transfer fluid in the cooling loop), before the heat exchange means. The second cooling means is used to further cool the heat transfer fluid of the cooling loop after passing through the heat storage and recovery means comprising second heat storage particles, and before entering the heat exchange means, so as to reduce the temperature of the heat transfer fluid entering the heat exchange means, thus allowing to further improve compression of the gas in the next stage and/or to reduce the design constraints relative to the compressed gas storage means.

Preferably, the second cooling means can comprise a dry cooler for cooling the heat transfer fluid only with ambient outside air. It is therefore an inexpensive cooling means, easy to implement.

According to a variant, the second cooling means can be a shell/tube, plate and/or spiral heat exchanger for heat exchange between the heat transfer fluid and another fluid that may be water, propane, butane, for example.

According to an advantageous configuration of the invention, at least one compression stage (preferably each compression stage) can comprise a separation means (a gas/liquid separator for example) for separating the compressed gas from a liquid phase before the compressed gas reaches the next compression stage or the compressed gas storage means (in the case of the last compression stage), each compression stage comprising a separation means preferably comprising a liquid storage means (preferably distinct) for storing the liquid phase at the pressure of the compression stage. Thus, in each compression stage, the system comprises a distinct separation means, and each separation means of each compression stage is connected to a distinct liquid storage means. Indeed, when the heat of the compressed gas is recovered in the heat storage and recovery device, or when the compressed gas is cooled in the cooling means, the compressed gas is cooled and condensation may occur. This can notably be the case when the gas is air collected from the ambient medium; it may then contain water vapor. This water vapor can then condense and the liquid phase produced is likely to generate damage in the compression stages or to the compressed gas storage means (due to corrosion for example). Moreover, each compression stage can comprise a distinct liquid storage means for storing the liquid phase at the pressure of the compression stage. Thus, each liquid phase recovered in each compression stage can be stored at the pressure of each compression stage, and this phase can be injected in the expansion stage at the corresponding closest pressure.

Advantageously, at least one expansion stage can comprise a mixing means (a mixer for example) for injecting and mixing with the compressed gas the liquid phase leaving one of the liquid storage means of the compression stages, the mixing means being positioned upstream from the heat storage and recovery device. Thus, it is possible to inject a liquid phase that is vaporized in the heat storage and recovery device before each expansion means, whether this heat storage and recovery device is direct (with a heat storage and recovery means comprising heat storage particles) or indirect (with a cooling loop comprising a heat transfer fluid, a heat exchange means without direct contact and a heat storage and recovery means comprising heat storage particles). Addition of the liquid phase allows to increase the gas flow rate at the inlet of the expansion means (the turbine for example) and thereby to improve the performances thereof.

Preferably, each expansion stage can comprise a mixing means for injecting and mixing with the compressed gas the liquid phase leaving one of the liquid storage means of the compression stages, each mixing means being positioned upstream from the heat storage and recovery device of each expansion stage.

Advantageously, each mixing means of each expansion stage is connected to a different liquid storage means, each of the liquid storage means being connected to a different liquid separation means of a compression stage. Thus, management of the liquid is optimized in the system. This system is further optimized when it comprises as many compression stages as expansion stages, therefore the number of compression stages is equal to the number of expansion stages, the number of separation means of the system, the number of liquid storage means of the system and the number of mixing means of the system.

According to an implementation of the invention, the pipes of at least the first expansion stage can be configured to circulate the compressed gas in at least one indirect heat storage and recovery device, and the pipes of at least another expansion stage (preferably at least the last expansion stage) can be configured to circulate the compressed gas in at least one direct heat storage and recovery device. Indeed, the first expansion stage is the one with the highest pressure: its pressure therefore corresponds to the last compression stage (the compression stage with the highest pressure). Thus, it is more advantageous to use the indirect heat storage and recovery device for this first expansion stage and subsequently for the second, then the third, and so on.

The invention further relates to a compressed-gas energy storage and recovery method comprising at least the following steps:

in energy storage phase:
a) compressing at least once a gas in a compression line comprising at least two compression stages, each compression stage comprising at least one compression means such as a compressor,
b) after each compression step, recovering the heat of the compressed gas in at least one heat storage and recovery device; the heat storage and recovery device of at least one compression step (preferably the last compression step) with an indirect heat storage and recovery device thus implementing an indirect heat storage and recovery step with a cooling loop comprising a heat exchanger for heat exchange between the compressed gas and a heat transfer fluid, and a (second) heat storage and recovery means comprising (second) heat storage particles for direct heat exchange between the heat transfer fluid and the (second) heat storage particles, and the heat storage and recovery step of at least another compression step with a direct heat storage and recovery device (comprising a first heat storage and recovery means comprising a fixed bed of first heat storage particles) for direct heat exchange (through direct contact) between the compressed gas and the first heat storage particles. Thus, the heat storage and recovery step of at least another compression step implements a direct heat storage and recovery step.
Indirect exchange allows to use a cooling loop and a heat transfer fluid as described above, and therefore a heat transfer fluid at a lower pressure than the compressed gas pressure. Direct exchange is easy to implement and it is therefore to be preferred for example when the pressure of the compression stage is relatively low in relation to the pressure of the heat transfer fluid (the pressure difference being of the order of 20 bar for example), or when the gain in mass and/or cost of the system is low, less than 2% for example,
c) storing the cooled compressed gas in at least one compressed gas storage means,
in energy recovery phase:
d) circulating the compressed gas leaving the compressed gas storage means in an expansion line comprising at least two expansion steps, and in each expansion step, heating the compressed gas by circulating it in one of the (direct or indirect) heat storage and recovery devices using the heat stored during the compression step, then expanding the heated compressed gas in an expansion means. Heating the gas before it passes through the expansion means (a turbine for example) allows the system performances to be increased.

In other words, the method is suited for implementing the system as described above.

Advantageously, as many compression steps as expansion steps can be carried out, and the heat storage and recovery device of each step b) can be used for heating the compressed gas of the expansion step at the corresponding pressure. Thus, each (direct or indirect) heat storage and recovery device of a compression stage is particularly suitable for heating an expansion stage (at the corresponding pressure). Heat recovery in the expansion line is thus optimized.

Advantageously, the heat of the compressed gas can be recovered by (first and/or second) heat storage particles, preferably contained in the (first or second) heat storage and recovery means of the direct or indirect heat storage and recovery device. Thus, the heat stored in the heat storage particles can be readily reused upon expansion for heating the compressed gas in the expansion stages.

The heat storage particles can be concrete balls, gravel and/or phase-change materials (possibly encapsulated). Concrete balls and gravel are simple and inexpensive solutions.

Preferably, after each heat recovery step, the compressed gas can be cooled at the outlet of the (direct or indirect) heat storage and recovery device in a first cooling means before the gas is sent to the next compression step or into the compressed gas storage means (for the last compression stage). Thus, the compressed gas can be better cooled before entering the next compression stage or the compressed gas storage means.

According to an implementation of the method of the invention, when the heat storage and recovery device is an indirect heat storage and recovery device (with a cooling loop as described in the system of the invention), the heat transfer fluid of the cooling loop can be cooled by a second cooling means positioned on the cooling loop after the heat storage and recovery means (upstream in the direction of flow of the heat transfer fluid in the cooling loop), more precisely between the heat storage and recovery means and the heat exchanger without direct contact, in the direction of flow of the heat transfer fluid in the cooling loop. The heat transfer fluid is therefore better cooled before it reaches the heat exchanger.

Advantageously, the compressed gas can be separated from a liquid phase it contains in a separation means, such as a separator, before the compressed gas is sent to the next compression stage or into the compressed gas storage means, the liquid leaving each separation means being stored at the pressure at which it is in a liquid storage means. Thus, the liquid that might condense upon cooling of the compressed gas by the heat storage and recovery device or by the first cooling means is separated from the gas phase, which allows to limit the risk of damage to the components of the next compression stage (notably the compression means) or to the compressed gas storage means.

Preferably, in each expansion stage, the liquid stored in a liquid storage means can be injected and mixed with the compressed gas, before each heating step. Thus, the flow rate of the gas passing through the expansion means is increased, which allows the performances of the expansion means to be increased. Furthermore, each liquid storage means being at a determined pressure and temperature, each expansion stage can advantageously use one of the liquid storage means of a compression stage (at the corresponding pressure).

Moreover, management of the liquid in the system is therefore optimized since the liquid leaving the compression phase is reintroduced in the expansion phase.

Figure 3:
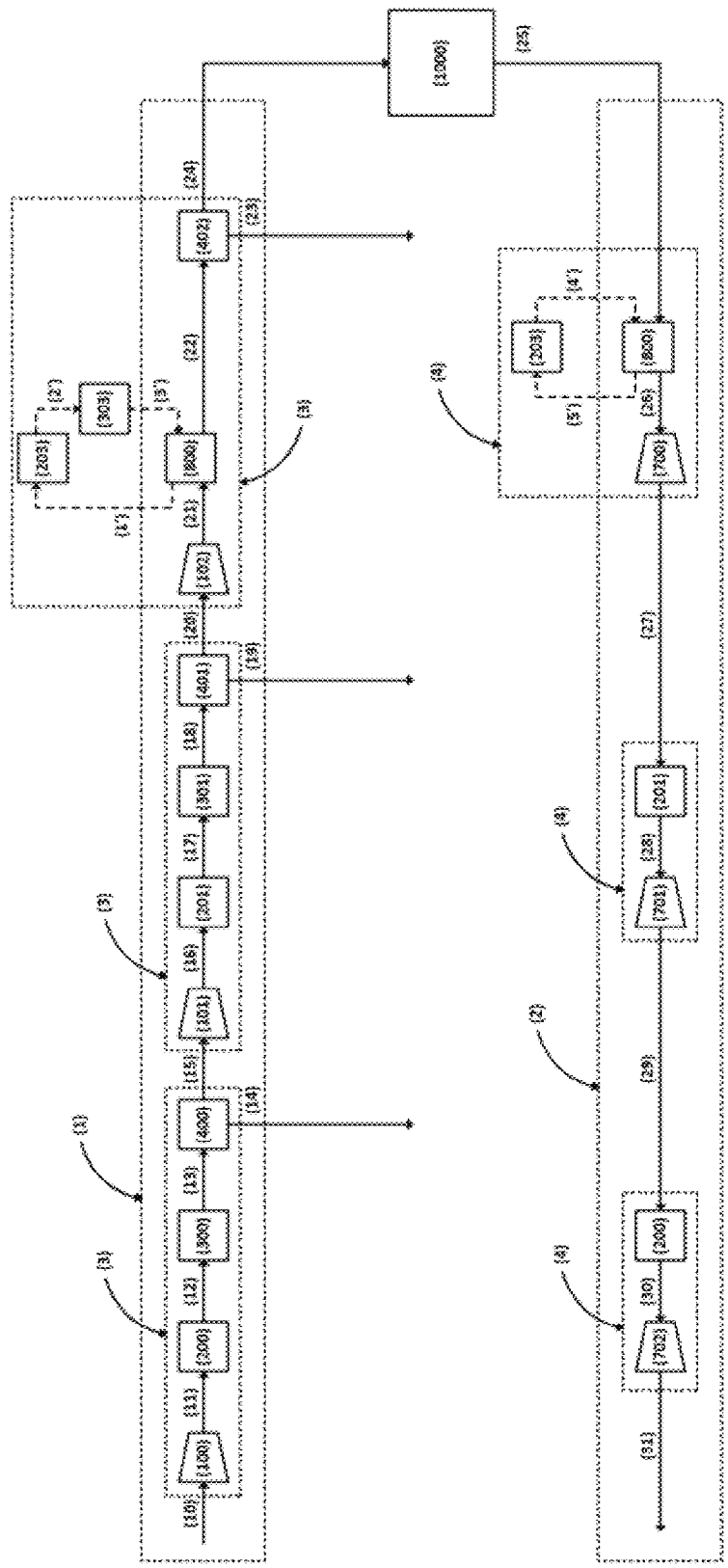
FIG. 3 shows a first embodiment of the system and of the method according to the invention.

FIG. 3 schematically illustrates, by way of non-limitative example, a first embodiment of the system according to the invention.

Figure 2:
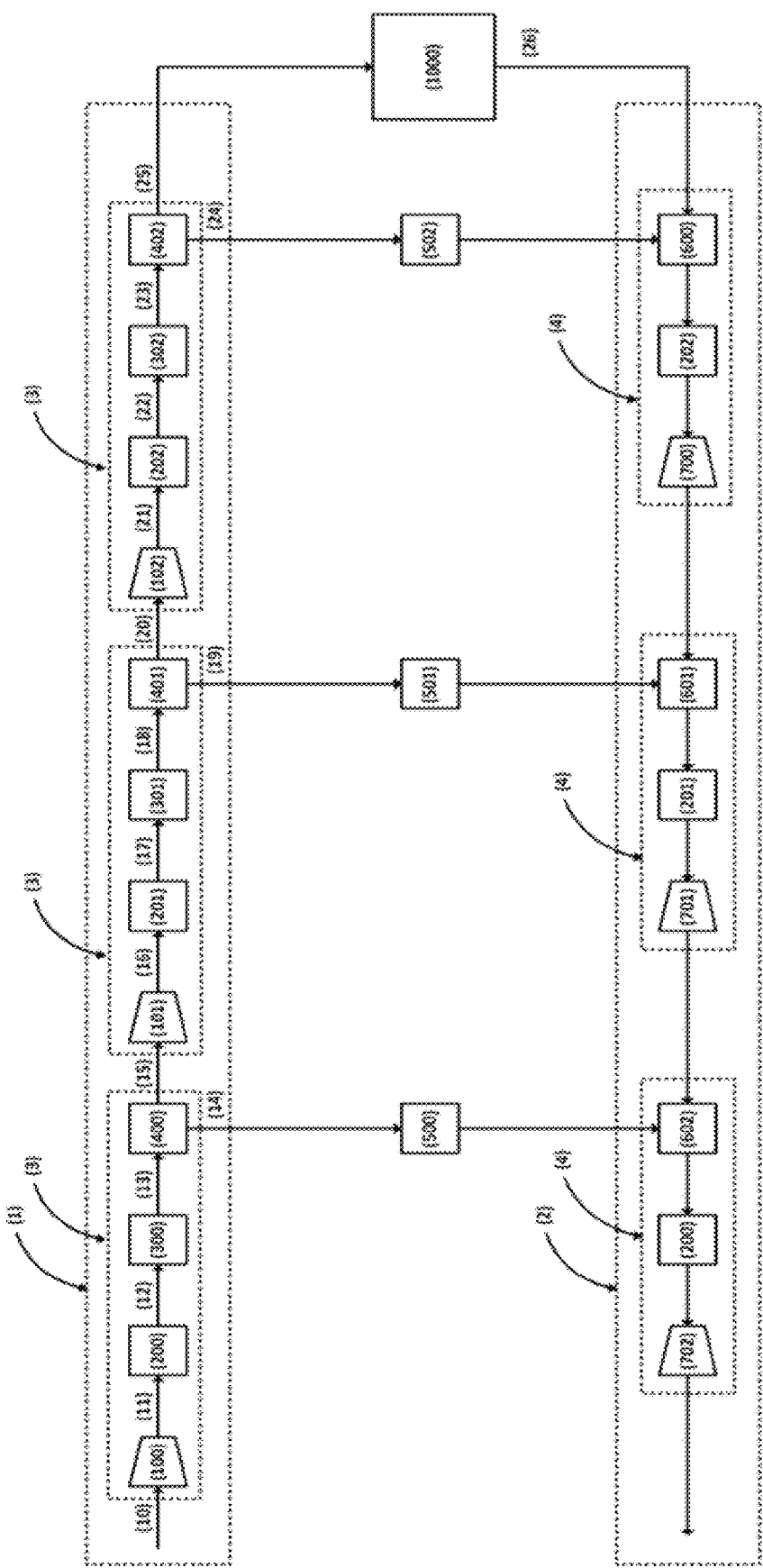

In this figure, the elements and references identical to those of FIGS. 1 and 2 correspond to the same elements and they are not detailed again here.

FIG. 3 differs from FIG. 1 in that heat storage and recovery device 202 of the last compression stage of FIG. 1 is replaced by an indirect heat storage and recovery device comprising a cooling loop. The cooling loop comprises a heat exchanger 800 without direct contact allowing heat exchange between the compressed gas and a heat transfer fluid contained in the cooling loop, a second heat storage and recovery means 203 comprising second heat storage particles forming a fixed bed, and a second cooling means 303 (a dry cooler) between second heat storage and recovery means 203 and heat exchanger 800 (in the direction of flow of the heat transfer fluid in the cooling loop).

Furthermore, in this FIG. 3, in the last compression stage, there is no first cooling means (such as a dry cooler) downstream from the indirect heat storage and recovery device (downstream from heat exchanger 800).

The system of FIG. 3 comprises two first heat storage and recovery means 200 and 201, each comprising first heat storage particles, which exchange heat directly between the first heat storage particles and the compressed gas.

The heat transfer fluid can notably be SYLTHERM™ (Dow, USA), as in the examples of FIGS. 3 to 6. However, other similar heat transfer fluids can be used in the system and in the method according to the invention.

FIG. 3 also differs from FIG. 1 regarding the expansion line, where heat storage and recovery device 202 of the first expansion stage of FIG. 1 is replaced by the indirect heat storage and recovery device of the last compression stage. Thus, before reaching first turbine 700 of the expansion line, the compressed gas flows through heat exchanger without direct contact 800 where it is heated by the heat transfer fluid, through the second heat storage particles contained in second heat storage and recovery means 203. When this cooling loop is used in the expansion stage, of course, the heat transfer fluid may not flow through the first cooling means in order to recover a maximum amount of heat so as to heat the compressed gas.

Figure 4:
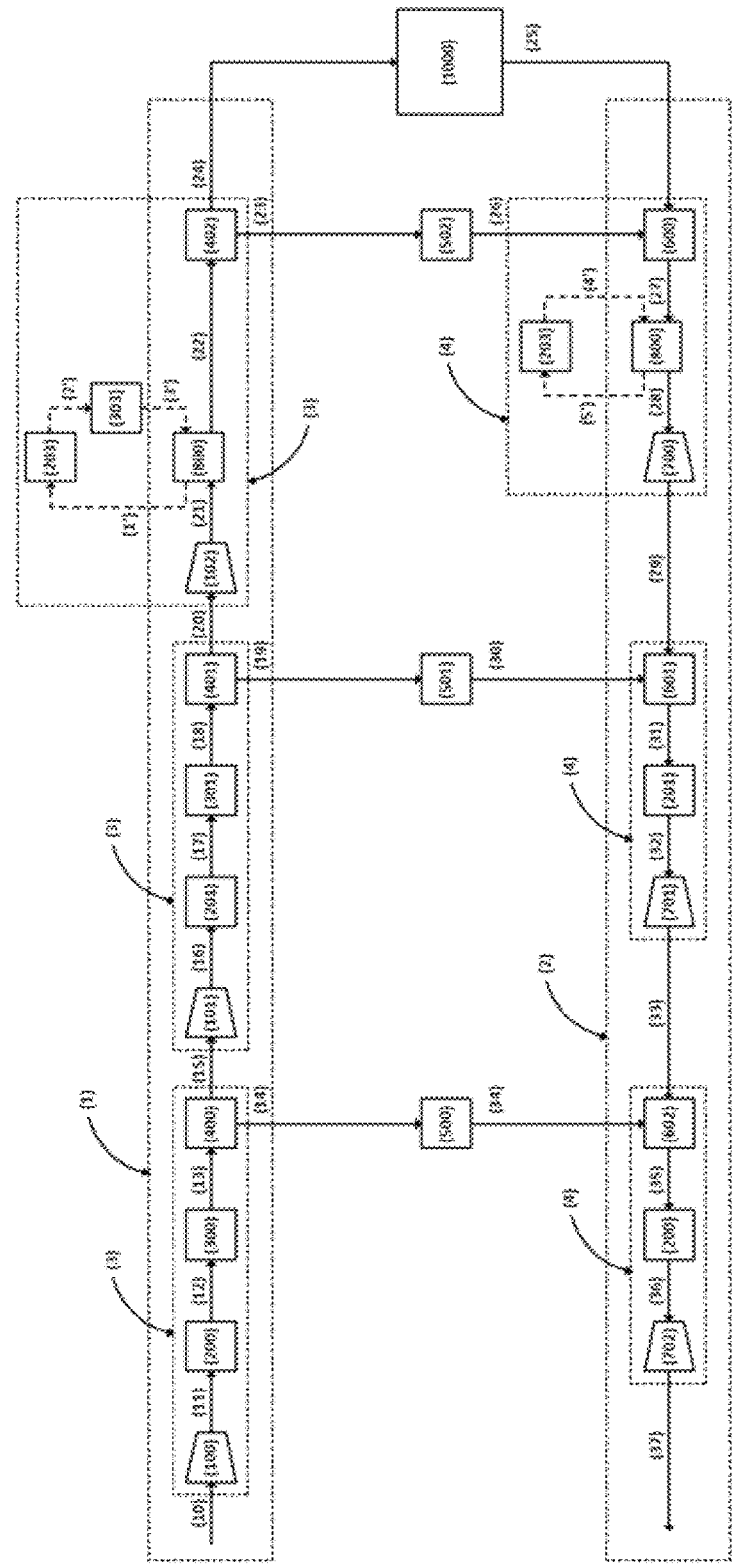
FIG. 4 shows a second embodiment of the system and of the method according to the invention.

FIG. 4 schematically illustrates, by way of non-limitative example, a second embodiment of the invention.

In this figure, the elements and references identical to those of FIGS. 1 to 3 correspond to the same elements, and they are therefore not detailed again.

Besides, this figure differs from FIG. 3 by the addition of liquid storage means 500, 501 and 502 at the outlet of each separation means, 400, 401 and 402 respectively.

Furthermore, in order to optimize the liquid management in the system, the system comprises mixing means 600, 601 and 602 at the outlet of each liquid storage means, 500, 501 and 502 respectively, for reintroducing the liquid before passage of the fluid into expansion means 700, 701 and 702.

Figure 5:
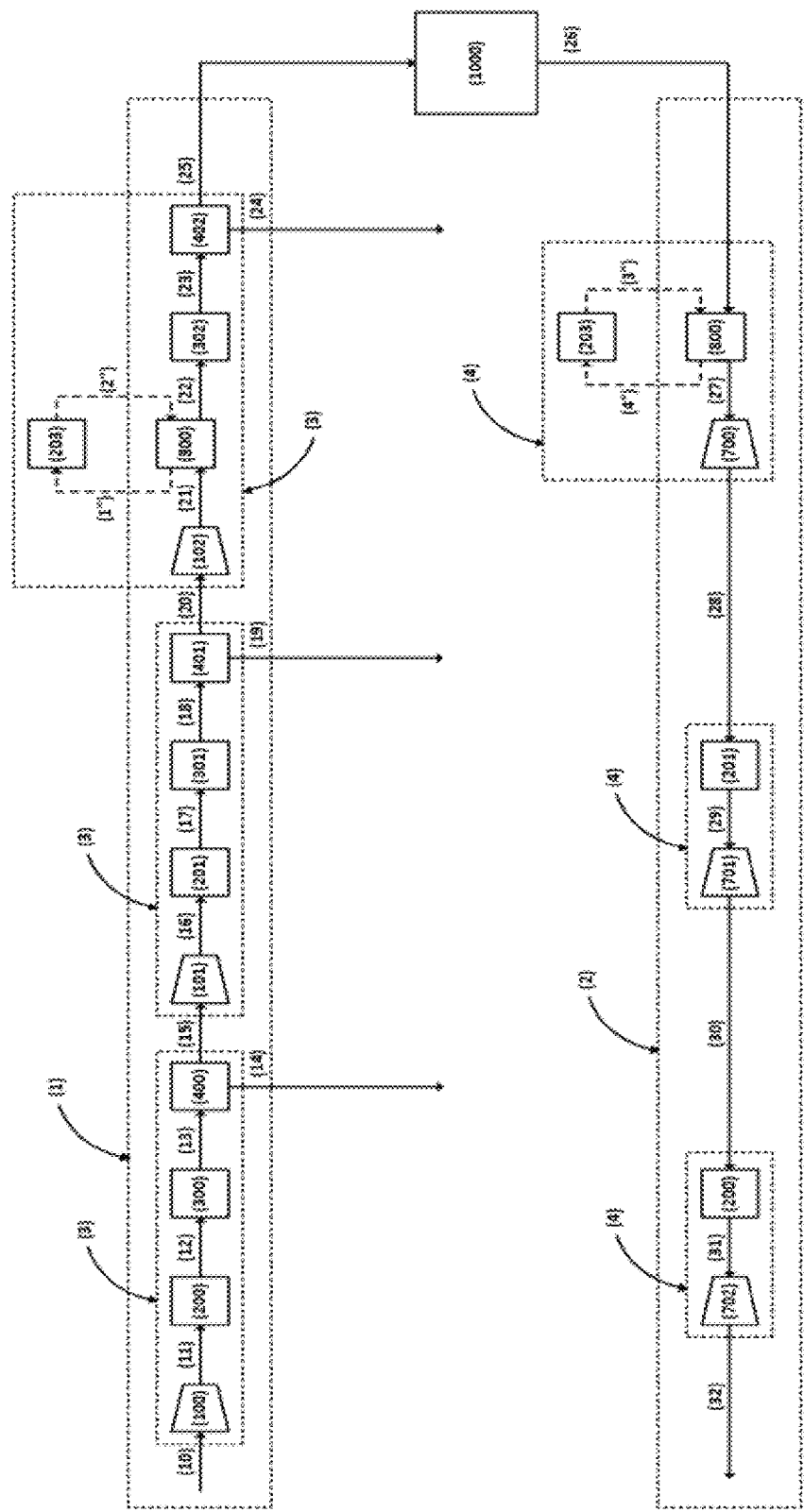
FIG. 5 shows a third embodiment of the system and of the method according to the invention.

FIG. 5 schematically illustrates, by way of non-limitative example, a third embodiment of the invention.

In this figure, the elements and references identical to those of FIGS. 1 to 4 correspond to the same elements, and they are therefore not detailed again.

The system of this figure differs from that of FIG. 3 by the removal of second cooling means 303 on the cooling loop of the indirect heat storage and recovery device, and by the addition of a first cooling means 302 downstream from the indirect heat storage and recovery device (downstream from heat exchanger 800 and before separation means 402 in the direction of flow of the compressed gas in the compression line).

The system of FIG. 5 comprises two first heat storage and recovery means 200 and 201, each comprising first heat storage particles, which directly exchange heat between the first heat storage particles and the compressed gas.

Figure 6:
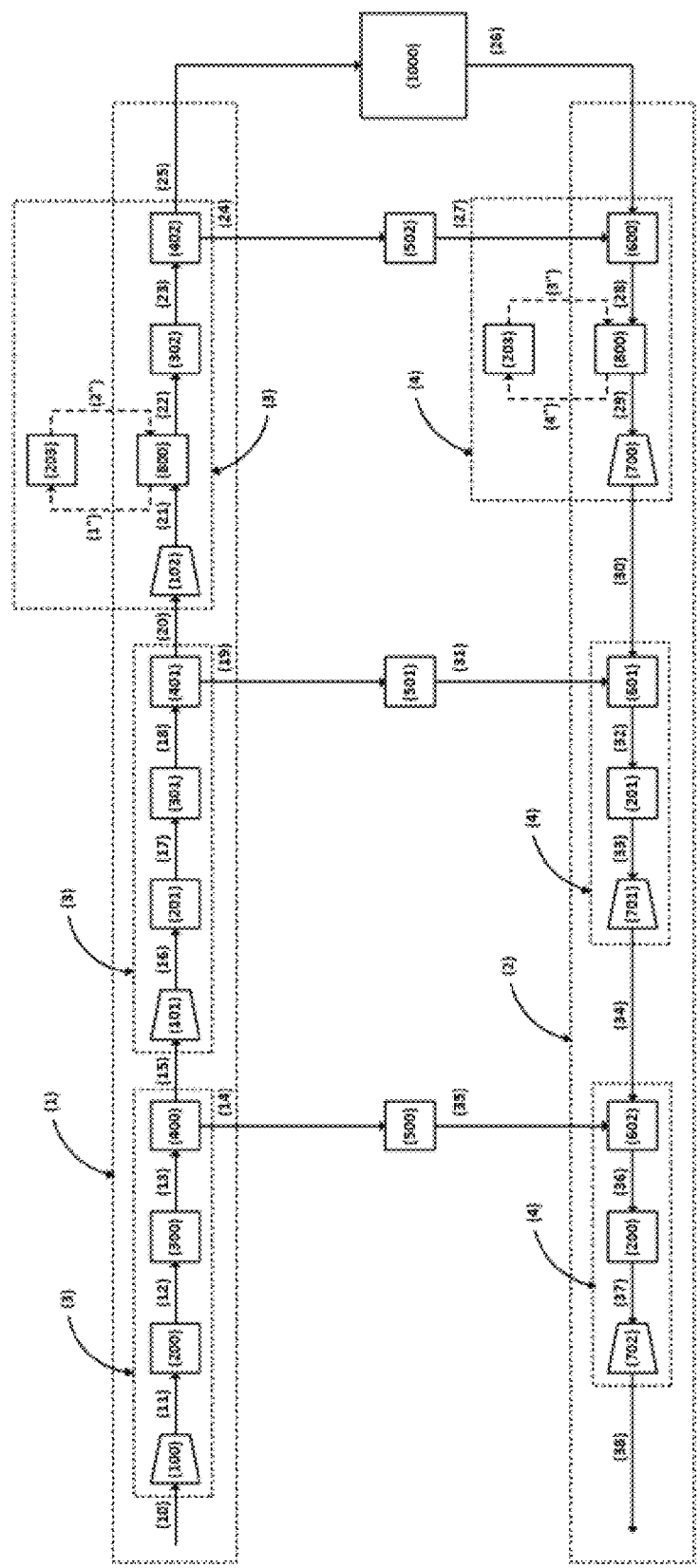
FIG. 6 shows a fourth embodiment of the system and of the method according to the invention.

FIG. 6 schematically illustrates, by way of non-limitative example, a fourth embodiment of the invention.

In this figure, the elements and references identical to those of FIGS. 1 to 5 correspond to the same elements, and they are therefore not detailed again.

The system of this figure differs from that of FIG. 5 by the addition of liquid storage means 500, 501 and 502 at the outlet of each separation means, 400, 401 and 402 respectively.

Furthermore, in order to optimize the liquid management in the system, the system comprises mixing means 600, 601 and 602 at the outlet of each liquid storage means, 500, 501 and 502 respectively, for reintroducing the liquid before passage of the fluid into expansion means 700, 701 and 702.

The system of FIG. 6 comprises two first heat storage and recovery means 200 and 201, each comprising first heat storage particles, which directly exchange heat between the first heat storage particles and the compressed gas.

In FIGS. 3 to 6, the compression line and the expansion line each advantageously comprise respectively three compression stages and three expansion stages, but a different number of compression and/or expansion stages could be used. Furthermore, in these figures, the first two compression stages comprise two first heat storage and recovery means 200 and 201, each comprising first heat storage particles, which directly exchange heat between the first heat storage particles and the compressed gas, and the last compression stage comprises a cooling loop with a second heat storage and recovery means 203, each comprising second heat storage particles for heat exchange between the second heat storage particles and a heat transfer fluid distinct (different) from the compressed gas. Of course, the system could comprise other first heat storage and recovery means and/or other cooling loops with other second heat storage and recovery means.

EXAMPLES

The systems of FIGS. 3 to 6 of the invention have been compared with the systems of the prior art illustrated in FIGS. 1 and 2. More precisely, the systems of the invention corresponding to FIGS. 3 and 5 are compared with the prior art of FIG. 1: all these systems do not reuse the liquid recovered at the separation means outlet, for the expansion phase. The systems of the invention corresponding to FIGS. 4 and 6 are compared with the prior art of FIG. 2: all these systems reuse the liquid recovered at the separation means outlet for the expansion phase.

For the embodiments of FIGS. 3 to 6 comprising a cooling loop in the compression stage with the highest pressure, the heat transfer fluid flowing through the cooling loop is SYLTHERM™.

The system according to the prior art of FIG. 1 operates for example as follows. During compression phase 1, a stream of outside air 10, at atmospheric pressure and at a temperature of 27° C., with a humidity of 14.6 g water/kg air, is compressed by a low-pressure compressor 100 from which it flows 11 at a temperature of 255° C. and a pressure of 6 bar (0.6 MPa). This stream 11 is sent to a low-pressure direct heat storage and recovery device 200 comprising first heat storage particles that directly exchange heat with the compressed gas, heat storage and recovery device 200 cooling the air to a temperature of 90° C. and storing this thermal energy in the heat storage particles until expansion phase 2. Stream 12 is cooled again by cooling means 300 until it reaches a temperature of 50° C. at the outlet. Stream 13 then consists of air and water from the humidity in the air, condensed during the cooling phases in direct heat storage and recovery device 200 and/or in cooling means 300. This condensed water 14 is separated from compression line 2 in a gas/liquid separator 400 operating at the pressure of the stream. Gas stream 15 leaving gas/liquid separator 400, totally gaseous again, is compressed by a medium-pressure compressor 101 from which it flows 16 at a temperature of 275° C. and a pressure of 28 bar. Stream 16 is sent to a medium-pressure direct heat storage and recovery device 201 comprising first heat storage particles that directly exchange heat with the compressed gas, heat storage and recovery device 201 cooling the air down to a temperature of 100° C. and storing this thermal energy in the heat storage particles until expansion phase 2. Stream 17 leaving direct heat storage and recovery device 201 is cooled again by a cooling means 301 until a temperature of 50° C. is reached at the outlet. Stream 18 at the outlet of cooling means 301 then consists of air and water from the humidity in the air, condensed during the cooling phases in direct heat storage and recovery device 201 and/or in cooling means 301. This condensed water 19 is separated from compression line 1 in a gas/liquid separator 401 operating at the pressure of the stream. Stream 20, again totally gaseous, leaving gas/liquid separator 401, is compressed by a high-pressure compressor 102 from which it flows at a temperature of 250° C. and a pressure of 117 bar. Stream 21 is sent to a high-pressure direct heat storage and recovery device 202 comprising first heat storage particles that directly exchange heat with the compressed gas, heat storage and recovery device 202 cooling the air down to a temperature of 45° C. and storing this thermal energy in the heat storage particles until expansion phase 2. Stream 22 leaving direct heat storage and recovery device 202 is cooled again by a cooling means 302 until it reaches a temperature of 30° C. at the outlet, 30° C. being the air storage temperature. Stream 23 then consists of air and water, from the humidity in the air, condensed during the cooling phases in direct heat storage and recovery device 202 and/or in cooling means 302. This condensed water 24 is separated from compression line 1 in a gas/liquid separator 402 operating at the pressure of stream 23. Air stream 25 compressed to a pressure of 117 bar and a temperature of 30° C. is then sent to compressed air storage means 1000 until energy recovery phase 2.

When electricity is to be produced, compressed air stream 26 at a pressure of 117 bar and at a temperature of 30° C., leaving compressed air storage means 1000, is heated in high-pressure direct heat storage and recovery device 202 that releases the heat stored in the heat storage particles during the compression phase until stream 27 reaches a temperature of 240° C. This hot compressed air stream 27 is expanded in high-pressure turbine 700 producing electricity via an alternator, until a pressure of 28 bar and a temperature of 85° C. are reached at the outlet 28. Stream 28 is heated in medium-pressure direct heat storage and recovery device 201 that releases the heat stored in the heat storage particles during the compression phase until stream 29 reaches a temperature of 265° C. This hot compressed air stream 29 is expanded in medium-pressure turbine 701 producing electricity via an alternator, until a pressure of 5 bar and a temperature of 75° C. are reached at the outlet 30. Stream 30 is heated in low-pressure direct heat storage and recovery device 200 that releases the heat stored in the heat storage particles during the compression phase until stream 31 reaches a temperature of 245° C. This hot compressed air stream 31 is expanded in low-pressure turbine 702 producing electricity via an alternator, until a pressure of 1.02 bar and a temperature of 80° C. are reached at the outlet 32.

The efficiency of the energy storage process of the example of FIG. 1 according to the prior art is 69.6% for a 100 MW power consumption of the compressors. The total flow rate of condensed water in the three compression stages is 7.5 t/h. The thermal storage capacity is 87 MW and the required cooling capacity is 20.5 MW.

The system of FIG. 3 operates for example as follows. During compression phase 1, a stream of outside air 10, at atmospheric pressure and at a temperature of 27° C., with a humidity of 14.6 g water per kg air, is compressed by a low-pressure compressor 100 from which it flows 11 at a temperature of 255° C. and at a pressure of 6 bar. This stream 11 is sent to a low-pressure direct heat storage and recovery device 200 comprising first heat storage particles directly exchanging heat with the compressed gas, heat storage and recovery device 200 cooling the air down to a temperature of 90° C. and storing this thermal energy in the heat storage particles until expansion phase 2. Stream 12 is cooled again by a cooling means 300 until a temperature of 50° C. is reached at the outlet. Stream 13 then consists of air and water from the humidity in the air, condensed during the cooling phases in direct heat storage and recovery device 200 and/or in cooling means 300. This condensed water 14 is separated from the stream of compression line 1 in a gas/liquid separator 400 operating at the pressure of stream 13. Stream 15, totally gaseous again, is compressed by a medium-pressure compressor 101 which it leaves at a temperature of 275° C. and a pressure of 28 bar. Stream 16 is sent to a medium-pressure direct heat storage and recovery device 201 comprising first heat storage particles directly exchanging heat with the compressed gas, heat storage and recovery device 201 cooling the air to a temperature of 93° C. and storing this thermal energy in the heat storage particles until expansion phase 2. Stream 17 is cooled again by a cooling means 301 until a temperature of 50° C. is reached at the outlet 18. Stream 18 the consists of air and water from the humidity in the air, condensed during the cooling phases in direct heat storage and recovery device 201 and/or in cooling means 301. This condensed water 19 is separated from the stream of compression line 1 in a gas/liquid separator 401 operating at the pressure of stream 18. Stream 20, totally gaseous again, is compressed by a high-pressure compressor 102 which it leaves at a temperature of 250° C. and at a pressure of 117 bar. Stream 21 is sent to an indirect-contact heat exchanger 800 allowing heat exchange between hot air stream 21 and a low-pressure (6 bar) heat transfer fluid stream 3'. Stream 21 is cooled down to a temperature of 55° C. at outlet 22. The heat transfer fluid is heated by thermal exchange until it reaches a temperature of 245° C. at the outlet of indirect-contact heat exchanger 800. This stream 1' is then sent to a low-pressure direct heat storage and recovery means 203 comprising second heat storage particles directly exchanging heat with the heat transfer fluid, heat storage and recovery means 203 cooling the heat transfer fluid to a temperature of 65° C. and storing this thermal energy in the second heat storage particles until expansion phase 2. Heat transfer fluid stream 2' is cooled again by a cooling means 303 until it reaches a temperature of 50° C. at outlet 3', and thus achieves a cooling loop between low-pressure direct heat storage and recovery means 203 and heat exchanger without direct contact 800, this assembly forming an indirect heat storage and recovery device. Stream 22 leaving this indirect heat storage and recovery device then consists of air and water from the humidity in the air, condensed during the cooling phase in heat exchanger 800. This condensed water is separated from the stream of compression line 1 in a gas/liquid separator 402 operating at the pressure of stream 22.

The compressed air stream at a pressure of 117 bar and at a temperature of 55° C. leaving gas/liquid separator 402 is then sent to compressed air storage means 1000 until energy recovery phase 2.

Furthermore, one considers that the temperature of the air stored in compressed air storage means 1000 drops by 10° C. during the interval between the compression and expansion phases.

When electricity is to be produced, the compressed air stream at a pressure of 117 bar and a temperature of 45° C. leaving compressed air storage means 1000 is heated by thermal exchange with low-pressure heat transfer fluid stream 4' in heat exchanger without direct contact 800 until the stream reaches the temperature of 230° C. Stream 4' is first heated in low-pressure heat storage and recovery means 203 that releases the heat stored in the second heat storage particles during the compression phase until stream 4' reaches a temperature of 235° C. The heat transfer fluid stream is cooled to a temperature of 50° C. at the outlet (5') of heat exchanger 800 and sent to low-pressure heat storage and recovery means 203 to achieve a heating loop between low-pressure heat storage and recovery means 203 and heat exchanger without direct contact 800. The hot compressed air stream is expanded in high-pressure turbine 700 producing electricity via an alternator, until it reaches at the outlet a pressure of 28 bar and a temperature of 80° C. The stream is then heated in medium-pressure direct heat storage and recovery device 201 that releases the heat stored in the first heat storage particles during the compression phase until the stream reaches a temperature of 265° C. This hot compressed air stream is expanded in medium-pressure turbine 701 producing electricity via an alternator, until a pressure of 5 bar and a temperature of 75° C. are reached at the outlet. The stream is heated in low-pressure direct heat storage and recovery device 200 that releases the heat stored in the first heat storage particles during the compression phase until the stream reaches a temperature of 245° C. This hot compressed air stream is expanded in low-pressure turbine 702 producing electricity via an alternator, until a pressure of 1.02 bar and a temperature of 80° C. are reached at the outlet.

The efficiency of the energy storage process is 69.3% for a 100 MW power consumption of the compressors. The total flow rate of condensed water in the three compression stages is 7.5 t/h. The thermal storage capacity is 84.5 MW and the required cooling capacity is 16.8 MW. Thus, the performances are close to those of the system of FIG. 1, with a lower required cooling capacity (which implies a lower energy consumption).

Integration of the heat transfer fluid cooling loop (or heating loop in the expansion phase) associated with the heat exchanger and the low-pressure direct heat storage and recovery means in the high-pressure stage allows to reduce the cost of heat storage and recovery means 203 by 79% in relation to heat storage and recovery means 202 in the example of FIG. 1. Furthermore, setting up the indirect heat storage and recovery device (heat exchanger, low-pressure heat storage and recovery means and heat transfer fluid) enables a 11% cost decrease in relation to the high-pressure direct heat storage and recovery device (consisting of heat storage and recovery means 202) in the example of FIG. 1.

The system of FIG. 5 operates for example as follows.

The first two compression stages 3, low and medium pressure, are similar to those of the example of FIG. 3.

The difference between the systems of FIGS. 3 and 5 lies in the high-pressure compression stage after the compression of air stream 20 by a high-pressure compressor 102 from which it flows at a temperature of 250° C. and a pressure of 117 bar. Stream 21 is sent to a heat exchanger without direct contact 800 allowing heat exchange between hot air stream 21 and a low-pressure heat transfer fluid stream 2". Stream 21 is cooled to a temperature of 50° C. at outlet 22. The heat transfer fluid heats up by thermal exchange until it reaches a temperature of 245° C. at the outlet. This stream 1" is then sent to a low-pressure direct heat storage and recovery means 203 comprising second heat storage particles, heat storage and recovery means 203 cooling the heat transfer fluid to a temperature of 50° C. and storing this thermal energy in the second heat storage particles until expansion phase 2, thus achieving a cooling loop between low-pressure direct heat storage and recovery means 203 and heat exchanger without direct contact 800. Stream 22 is cooled again by a cooling means 302 until a temperature of 30° C. is reached at the outlet, 30° C. being the air storage temperature. Stream 23 then consists of air and water from the humidity in the air, condensed during the cooling phases in heat exchanger 800 and/or in cooling means 302. This condensed water 24 is separated from the stream of compression line 1 in a gas/liquid separator 402 operating at the pressure of stream 23.

Compressed air stream 25 at a pressure of 117 bar and a temperature of 30° C. is then sent to compressed air storage means 1000 until energy recovery phase 2.

When electricity is to be produced, compressed air stream 26 at a pressure of 117 bar and a temperature of 30° C. leaving compressed air storage means 1000 is heated by thermal exchange with low-pressure heat transfer fluid stream 3" in heat exchanger without direct contact 800 until stream 27 reaches the temperature of 230° C. Stream 3" is first heated in low-pressure direct heat storage and recovery means 203 that releases the heat stored in the second heat storage particles during the compression phase until stream 3" reaches a temperature of 235° C. Heat transfer fluid stream 4" is cooled to a temperature of 35° C. at the outlet of heat exchanger 800 and sent to low-pressure heat storage and recovery means 203 to achieve a heating loop between low-pressure heat storage and recovery means 203 and heat exchanger without direct contact 800. Hot compressed air stream 27 is expanded in high-pressure turbine 700 producing electricity via an alternator, until it reaches at the outlet a pressure of 28 bar and a temperature of 80° C. Stream 28 is heated in medium-pressure direct heat storage and recovery device 201 that releases the heat stored in the first heat storage particles during the compression phase until stream 29 reaches a temperature of 265° C. This hot compressed air stream 29 is expanded in medium-pressure turbine 701 producing electricity via an alternator, until a pressure of 5 bar and a temperature of 75° C. are reached at the outlet. Stream 30 is heated in low-pressure direct heat storage and recovery device 200 that releases the heat stored in the first heat storage particles during the compression phase until stream 31 reaches a temperature of 245° C. This hot compressed air stream 31 is expanded in low-pressure turbine 702 producing electricity via an alternator, until a pressure of 1.02 bar and a temperature of 80° C. are reached at outlet 32.

The efficiency of the energy storage process is 69.2% for a 100 MW power consumption of the compressors. The total flow rate of condensed water in the three compression stages is 7.6 t/h. The thermal storage capacity is 87 MW and the required cooling capacity is 21 MW. Thus, the performances of this system are close to those of the system of FIG. 1.

Integration of the heat transfer fluid loop associated with the heat exchanger and the low-pressure heat storage and recovery means in the high-pressure stage allows to reduce the cost of heat storage and recovery means 203 by 79% in relation to that 202 of FIG. 1.

The system of the prior art of FIG. 2 operates for example as follows. During compression phase 1, a stream of outside air 10, at a pressure of 1.02 bar and a temperature of 27° C., with a humidity of 14.6 g water per kg air, is compressed by a low-pressure compressor 100 which it leaves at a temperature of 255° C. and a pressure of 6 bar. This stream 11 is sent to a low-pressure direct heat storage and recovery device 200 comprising first heat storage particles directly exchanging heat with the compressed gas, the heat storage and recovery device cooling the air down to a temperature of 80° C. and storing this thermal energy in the first heat storage particles until expansion phase 2. Stream 12 is cooled again by a cooling means 300 to a temperature of 50° C. at the outlet. Stream 13 then consists of air and water from the humidity in the air, condensed during the cooling phases in direct heat storage and recovery device 200 and/or in cooling means 300. This condensed water 14 is separated from the stream of compression line 1 in a gas/liquid separator 400 operating at the pressure of stream 13, then it is sent to a liquid storage means 500 at a maintained pressure of 6 bar. Stream 15, totally gaseous again, is compressed by a medium-pressure compressor 101 which it leaves at a temperature of 275° C. and a pressure of 28 bar. Stream 16 is sent to a medium-pressure direct heat storage and recovery device 201 comprising first heat storage particles directly exchanging heat with the compressed gas, heat storage and recovery device 201 cooling the air down to a temperature of 80° C. and storing this thermal energy in the first heat storage particles until expansion phase 2. Stream 17 is cooled again by a cooling means 301 until it reaches a temperature of 50° C. at the outlet. Stream 18 then consists of air and water from the humidity in the air, condensed during the cooling phases in direct heat storage and recovery device 201 and/or in cooling means 301. This condensed water 19 is separated from the stream of compression line 1 in a liquid/gas separator 401 operating at the pressure of stream 18, then sent to a liquid storage means 501 at a maintained pressure of 28 bar. Stream 20, totally gaseous again, is compressed by a high-pressure compressor 102 from which it flows at a temperature of 250° C. and a pressure of 117 bar. Stream 21 is sent to a high-pressure direct heat storage and recovery device 202 comprising first heat storage particles directly exchanging heat with the compressed gas, heat storage and recovery device 202 cooling the air down to a temperature of 40° C. and storing this thermal energy in the first heat storage particles until expansion phase 2. Stream 22 is again cooled by a cooling means 302 until a temperature of 30° C. is reached at the outlet, 30° C. being the air storage temperature. Stream 23 then consists of air and water from the humidity in the air, condensed during the cooling phases in direct heat storage and recovery device 202 and/or in cooling means 302. This condensed water 24 is separated from the stream of compression line 1 in a gas/liquid separator 402 operating at the pressure of stream 23, then sent to a liquid storage means 502 at a maintained pressure of 117 bar.

Compressed air stream 25 at a pressure of 117 bar and a temperature of 30° C. is then sent to compressed air storage means 1000 until next energy recovery phase 2.

When electricity is to be produced, a stream of condensed water from liquid storage means 502 at a pressure of 117 bar and a temperature of 30° C. is reinjected into compressed air stream 26 leaving compressed air storage means 1000 via mixer 600. The stream thus formed is heated in high-pressure direct heat storage and recovery device 202 that releases the heat stored in the first heat storage particles during the compression phase until the stream reaches a temperature of 240° C. This hot compressed air stream is expanded in high-pressure turbine 700 producing electricity via an alternator, until it reaches at the outlet a pressure of 28 bar and a temperature of 85° C. A condensed water stream from liquid storage means 501 at a pressure of 28 bar and a temperature of 50° C. is reinjected into the compressed air stream leaving high-pressure turbine 700 via mixer 601. The stream thus formed is heated in medium-pressure direct heat storage and recovery device 201 that releases the heat stored in the first heat storage particles during the compression phase until the stream reaches a temperature of 255° C. This hot compressed air stream is expanded in medium-pressure turbine 701 producing electricity via an alternator, until it reaches at the outlet a pressure of 5 bar and a temperature of 70° C. A condensed water stream from liquid storage means 500 at a pressure of 6 bar and a temperature of 50° C. is reinjected into the compressed air stream leaving medium-pressure turbine 701 via mixer 602. The stream thus formed is heated in low-pressure direct heat storage and recovery device 200 that releases the heat stored in the first heat storage particles during the compression phase until the stream reaches a temperature of 245° C. This hot compressed air stream is expanded in low-pressure turbine 702 producing electricity via an alternator, until it reaches at the outlet a pressure of 1.02 bar and a temperature of 80° C.

The efficiency of the energy storage process is 70.4% for a 100 MW power consumption of the compressors. The total flow rate of condensed water in the three compression stages is 7.5 t/h. The thermal storage capacity is 93 MW and the required cooling capacity is 14.6 MW.

The system of FIG. 4 operates for example as follows.

During compression phase 1, a stream of outside air 10, at a pressure of 1.02 bar and a temperature of 27° C., with a humidity of 14.6 g water per kg air, is compressed by a low-pressure compressor 100 which it leaves at a temperature of 255° C. and a pressure of 6 bar. This stream 11 is sent to a low-pressure direct heat storage and recovery device 200 comprising first heat storage particles directly exchanging heat with the compressed gas, heat storage and recovery device 200 cooling the air down to a temperature of 80° C. and storing this thermal energy in the first heat storage particles until expansion phase 2. Stream 12 is cooled again by a cooling means 300 to a temperature of 50° C. at the outlet. Stream 13 then consists of air and water from the humidity in the air, condensed during the cooling phases in direct heat storage and recovery device 200 and/or in cooling means 300. This condensed water 14 is separated from the stream of compression line 1 in a gas/liquid separator 400 operating at the pressure of stream 13, then it is sent to a liquid storage means 500 at a maintained pressure of 6 bar. Stream 15, totally gaseous again, is compressed by a medium-pressure compressor 101 which it leaves at a temperature of 275° C. and a pressure of 28 bar. Stream 16 is sent to a medium-pressure direct heat storage and recovery device 201 comprising first heat storage particles directly exchanging heat with the compressed gas, heat storage and recovery device 201 cooling the air down to a temperature of 80° C. and storing this thermal energy in the first heat storage particles until expansion phase 2. Stream 17 is cooled again by a cooling means 301 until it reaches a temperature of 50° C. at the outlet. Stream 18 then consists of air and water from the humidity in the air, condensed during the cooling phases in direct heat storage and recovery device 201 and/or in cooling means 301. This condensed water 19 is separated from the stream in compression line 1 in a gas/liquid separator 401 operating at the pressure of stream 18, then sent to a liquid storage means 501 at a maintained pressure of 28 bar. Stream 20, totally gaseous again, is compressed by a high-pressure compressor 102 from which it flows at a temperature of 250° C. and a pressure of 117 bar. Stream 21 is sent to an indirect-contact heat exchanger 800 allowing heat exchange between hot air stream 21 and a low-pressure heat transfer fluid stream 3'. Stream 21 is cooled until it reaches a temperature of 55° C. at the outlet of indirect-contact heat exchanger 800. The heat transfer fluid heats up by thermal exchange until it reaches a temperature of 245° C. at 1'. This stream 1' is then sent to a low-pressure heat storage and recovery means 203 comprising second heat storage particles directly exchanging heat with the heat transfer fluid, heat storage and recovery means 203 cooling the heat transfer fluid down to a temperature of 60° C. and storing this thermal energy in the second heat storage particles until expansion phase 2. Heat transfer fluid stream 2' is again cooled by a second cooling means 303 until a temperature of 50° C. is reached at outlet 3', thus achieving a cooling loop between low-pressure heat storage and recovery means 203 and indirect-contact heat exchanger 800, thus forming an indirect heat storage and recovery device. Stream 22 then consists of air and water from the humidity in the air, condensed during the cooling phase in heat exchanger 800. This condensed water is separated from the stream in compression line 1 in a gas/liquid separator 402 operating at the pressure of stream 22, then sent to a liquid storage means 502 at a maintained pressure of 117 bar.

The compressed air stream at a pressure of 117 bar and a temperature of 55° C. is then sent to compressed air storage means 1000 until energy recovery phase 2. One considers that the temperature of the air stored in storage means 1000 drops by 10° C. in the interval between the compression and expansion phases.

When electricity is to be produced, a condensed water stream from liquid storage means 502 at a pressure of 117 bar and a temperature of 55° C. is reinjected into the compressed air stream leaving compressed air storage means 1000 via mixer 600. The stream thus formed is heated by thermal exchange with low-pressure heat transfer fluid stream 4' in indirect-contact heat exchanger 800 until the stream reaches a temperature of 230° C. Stream 4' is first heated in low-pressure heat storage and recovery means 203 that releases the heat stored in the second heat storage particles during the compression phase until stream 4' reaches a temperature of 235° C. The heat transfer fluid stream is cooled to a temperature of 50° C. at the outlet 5' of heat exchanger 800 and sent to low-pressure heat storage and recovery means 203 to achieve a heating loop between low-pressure heat storage and recovery means 203 and indirect-contact heat exchanger 800. This hot compressed air stream is expanded in high-pressure turbine 700 producing electricity via an alternator, until it reaches a pressure of 28 bar and a temperature of 75° C. at the outlet. A condensed water stream from liquid storage means 501 at a pressure of 28 bar and a temperature of 50° C. is reinjected into the compressed air stream via mixer 601. The stream is heated in medium-pressure direct heat storage and recovery device 201 that releases the heat stored in the first heat storage particles during the compression phase until the stream reaches a temperature of 255° C. This hot compressed air stream is expanded in medium-pressure turbine 701 producing electricity via an alternator, until a pressure of 5 bar and a temperature of 70° C. are reached at the outlet. A condensed water stream from liquid storage means 500 at a pressure of 6 bar and a temperature of 50° C. is reinjected into the compressed air stream via mixer 602. The stream thus formed is heated in low-pressure direct heat storage and recovery device 200 that releases the heat stored in the first heat storage particles during the compression phase until the stream reaches a temperature of 245° C. This hot compressed air stream is expanded in low-pressure turbine 702 producing electricity via an alternator, until a pressure of 1.02 bar and a temperature of 85° C. are reached at the outlet.

The efficiency of the energy storage process is 69.9% for a 100 MW power consumption of the compressors. The total flow rate of condensed water in the three compression stages is 7.5 t/h. The thermal storage capacity is 90.5 MW and the required cooling capacity is 11.5 MW. The required cooling capacity is thus reduced by 3.1 MW in relation to the system of FIG. 2 of the prior art.

Integration of the heat transfer fluid cooling loop (or heating loop in the expansion phase) associated with the heat exchanger and the low-pressure direct heat storage and recovery means in the high-pressure stage allows to reduce the cost of heat storage and recovery means 203 by 79% in relation to heat storage and recovery means 202 of FIG. 2. Furthermore, setting up the indirect heat storage and recovery device (comprising the heat exchanger without direct contact, the low-pressure heat storage and recovery means and the heat transfer fluid) enables a 9% cost decrease in relation to the heat storage and recovery device (consisting of heat storage and recovery means 202) in the system of FIG. 2.

The system of FIG. 6 operates for example as follows.

The first two compression stages 3, low and medium pressure, are similar to those of the system of FIG. 4.

The difference between the systems of FIGS. 4 and 6 lies in the high-pressure compression stage after the compression of air stream 20 by a high-pressure compressor 102 from which it flows 21 at a temperature of 250° C. and a pressure of 117 bar.

Stream 21 is sent to an indirect-contact heat exchanger 800 allowing heat exchange between hot air stream 21 and a low-pressure heat transfer fluid stream 2". Stream 21 is cooled to a temperature of 50° C. at the outlet of indirect-contact heat exchanger 800. The heat transfer fluid heats up by thermal exchange until it reaches a temperature of 245° C. at 1". This stream 1" is then sent to a low-pressure direct heat storage and recovery means 203 comprising second heat storage particles directly exchanging heat with the heat transfer fluid, heat storage and recovery means 203 cooling the heat transfer fluid to a temperature of 50° C. and storing this thermal energy in the second heat storage particles until expansion phase 2. The heat transfer fluid thus achieves a cooling loop between low-pressure heat storage and recovery means 203 and indirect-contact heat exchanger 800. Stream 22 is cooled again by a cooling means 302 until a temperature of 30° C. is reached at the outlet, 30° C. being the air storage temperature. Stream 23 then consists of air and water from the humidity in the air, condensed during the cooling phases in heat exchanger without direct contact 800 and/or in cooling means 302. This condensed water 24 is separated from the stream of compression line 1 in a gas/liquid separator 402 operating at the pressure of stream 23, then sent to a liquid storage means 502 at a maintained pressure of 117 bar.

Compressed air stream 25 at a pressure of 117 bar and a temperature of 30° C. is then sent to compressed air storage means 1000 until energy recovery phase 2.

When electricity is to be produced, a condensed water stream from liquid storage means 502 at a pressure of 117 bar and a temperature of 30° C. is reinjected into compressed air stream 26 leaving compressed air storage means 1000 via mixer 600.

The stream thus formed is heated by thermal exchange with low-pressure heat transfer fluid stream 3" in indirect-contact heat exchanger 800 until the stream reaches the temperature of 230° C. Stream 3" is first heated in low-pressure heat storage and recovery means 203 that releases the heat stored in the second heat storage particles during the compression phase until stream 3" reaches a temperature of 235° C. The heat transfer fluid stream is cooled to a temperature of 35° C. at the outlet 4" of indirect-contact heat exchanger 800 and sent to low-pressure heat storage and recovery means 203 to achieve a heating loop between low-pressure heat storage and recovery means 203 and indirect-contact heat exchanger 800. The hot compressed air stream is expanded in high-pressure turbine 700 producing electricity via an alternator, until it reaches at the outlet a pressure of 28 bar and a temperature of 80° C. A condensed water stream from liquid storage means 501 at a pressure of 28 bar and a temperature of 50° C. is reinjected into the compressed air stream via mixer 601. The stream thus formed is heated in medium-pressure direct heat storage and recovery device 201 that releases the heat stored in the first heat storage particles during the compression phase until the stream reaches a temperature of 255° C. This hot compressed air stream is expanded in medium-pressure turbine 701 producing electricity via an alternator, until a pressure of 5 bar and a temperature of 70° C. are reached at the outlet. A condensed water stream from liquid storage means 500 at a pressure of 6 bar and a temperature of 50° C. is reinjected into the compressed air stream via mixer 602. The stream thus formed is heated in low-pressure direct heat storage and recovery device 200 that releases the heat stored in the first heat storage particles during the compression phase until the stream reaches a temperature of 245° C. This hot compressed air stream is expanded in low-pressure turbine 702 producing electricity via an alternator, until a pressure of 1.02 bar and a temperature of 85° C. are reached at the outlet.

The efficiency of the energy storage process is 69.7% for a 100 MW power consumption of the compressors. The total flow rate of condensed water in the three compression stages is 7.6 t/h. The thermal storage capacity is 93 MW and the required cooling capacity is 15 MW.

Integration of the heat transfer fluid loop associated with the heat exchanger and low-pressure heat storage and recovery means 203 in the high-pressure stage allows to reduce the cost of heat storage and recovery means 203 by 79% in relation to heat storage and recovery means 202 of FIG. 2.

The invention claimed is:

1. A compressed-gas energy storage and recovery system comprising:
   a gas compression line with at least two compression stages, each compression stage comprising a compression means, and a heat storage and recovery device arranged downstream from compression means, in the direction of flow of the compressed gas in the compression stage, wherein, within each compression stage, each heat storage and recovery device is either exclusively direct or exclusively indirect,
   at least one compressed gas storage means arranged at the outlet of gas compression line for storing the compressed gas, and
   an expansion line for expanding the compressed gas stored in compressed gas storage means, expansion line comprising at least two successive expansion stages, each expansion stage comprising pipes and an expansion means, the pipes of each expansion stage being configured to circulate the compressed gas in at least one heat storage and recovery device of compression stages so as to heat the compressed gas before expansion means, wherein:
   in at least one of compression stages, the heat storage and recovery device comprises a direct heat storage and recovery device comprising at least a first heat storage and recovery means comprising first heat storage particles, the first heat storage and recovery means being configured for direct heat exchange between the compressed gas and the first heat storage particles, and
   in at least the compression stage immediately upstream of the compressed gas storage means, in the direction of flow of the compressed gas, the heat storage and recovery device consists of an indirect heat storage and recovery device comprising a cooling loop, the cooling loop comprising a heat exchanger without direct contact for heat exchange between the compressed gas and a heat transfer fluid able to flow through the cooling loop, the cooling loop comprising a second heat storage and recovery means comprising second heat storage particles, the second heat storage and recovery means being configured for direct heat exchange between the second heat storage particles and the heat transfer fluid.

2. The system as claimed in claim 1, wherein said compression line comprises as many compression stages as the expansion line comprises expansion stages, each heat storage and recovery device of a compression stage being used in the expansion stage at the corresponding pressure.

3. The system as claimed in claim 2, wherein the expansion line and the compression line each comprise three stages.

4. The system as claimed in claim 1, wherein at least one compression stage comprises a first cooling means downstream from the heat storage and recovery device.

5. The system as claimed in claim 4, wherein the cooling means comprises a dry cooler.

6. The system as claimed in claim 1, wherein the cooling loop comprises a second cooling means downstream, in the direction of flow during charging of the system, from second heat storage and recovery means.

7. The system as claimed in claim 6, wherein the second cooling means comprises a dry cooler.

8. The system as claimed in claim 1, wherein at least one compression stage comprises a separation means for separating the compressed gas from a liquid phase before the compressed gas reaches the next compression stage or compressed gas storage means.

9. The system as claimed in claim 8, wherein at least one expansion stage comprises a mixing means for mixing with said compressed gas said liquid phase from one of liquid storage means of compression stages, mixing means being positioned upstream from said heat storage and recovery device.

10. The system as claimed in claim 8, wherein each compression stage comprises a liquid storage means for storing the liquid phase at the pressure of compression stage.

11. The system as claimed in claim 1, wherein the pipes of at least the expansion stage immediately downstream of the compressed gas storage means are configured to circulate the compressed gas in at least one indirect heat storage and recovery device, and the pipes of at least another expansion stage are configured to circulate the compressed gas in at least one direct heat storage and recovery device.

* * * * *